US012236375B2

(12) United States Patent
Kaplan et al.

(10) Patent No.: US 12,236,375 B2
(45) Date of Patent: Feb. 25, 2025

(54) SYSTEM AND METHOD FOR PREDICTING SERVICE METRICS USING HISTORICAL DATA

(71) Applicant: NICE LTD., Ra'anana (IL)

(72) Inventors: Noam Kaplan, Tel Aviv (IL); Gennaldi Lembersky, Ra'anana (IL)

(73) Assignee: NICE LTD., Ra'anana (IL)

( * ) Notice: Subject to any disclaimer, the term of this patent is extended or adjusted under 35 U.S.C. 154(b) by 167 days.

(21) Appl. No.: 17/694,784

(22) Filed: Mar. 15, 2022

(65) Prior Publication Data

US 2023/0297907 A1    Sep. 21, 2023

(51) Int. Cl.
*G06Q 10/00* (2023.01)
*G06Q 10/0631* (2023.01)
*G06Q 10/0639* (2023.01)

(52) U.S. Cl.
CPC ....... *G06Q 10/063112* (2013.01); *G06Q 10/063116* (2013.01); *G06Q 10/06316* (2013.01); *G06Q 10/06393* (2013.01)

(58) Field of Classification Search
None
See application file for complete search history.

(56) References Cited

U.S. PATENT DOCUMENTS

| 8,175,254 | B2 | 5/2012 | Li |
| 9,883,037 | B1 | 1/2018 | Lewis |
| 2012/0087486 | A1* | 4/2012 | Guerrero .......... G06Q 10/06311 703/6 |
| 2022/0027837 | A1* | 1/2022 | D'Attilio ............ H04M 3/5175 |
| 2022/0157165 | A1* | 5/2022 | Dantrey ................. G06N 3/047 |
| 2022/0180276 | A1* | 6/2022 | Silverman ........ G06Q 10/06315 |
| 2023/0061899 | A1* | 3/2023 | Venkataraman ............................ G06Q 10/06312 |

OTHER PUBLICATIONS

Office Action in U.S. Appl. No. 18/096,732 dated Dec. 3, 2024.

* cited by examiner

*Primary Examiner* — Matheus Ribeiro Stivaletti
(74) *Attorney, Agent, or Firm* — PEARL COHEN ZEDEK LATZER BARATZ LLP

(57) ABSTRACT

A method for allocating resources for a plurality of time intervals, including: receiving a forecasted workload and at least one required service metric value; applying a search algorithm to identify an initial allocation assignment; inputting the assignment to a machine learning algorithm, the machine learning algorithm trained on historic data of past intervals; predicting an expected service metric value provided by the initial allocation assignment; adjusting the initial allocation assignment based on a difference between the expected service metric value and the corresponding required service metric value; iteratively repeating the applying, inputting, predicting, and adjusting operations until one of: the expected service metric value predicted for an adjusted allocation assignment is within a predetermined distance of the corresponding at least one required service metric value for the interval; or a predetermined time has elapsed.

15 Claims, 10 Drawing Sheets

502 — RECEIVING A FORECASTED WORKLOAD AND AT LEAST ONE REQUIRED SERVICE METRIC VALUE FOR EACH OF THE PLURALITY OF TIME INTERVALS

504 — APPLYING A SEARCH ALGORITHM TO IDENTIFY AN INITIAL ALLOCATION ASSIGNMENT

506 — INPUTTING THE INITIAL ALLOCATION ASSIGNMENT TO A MACHINE LEARNING ALGORITHM, WHEREIN THE MACHINE LEARNING ALGORITHM HAS BEEN PREVIOUSLY TRAINED ON HISTORIC DATA OF A PLURALITY OF PAST INTERVALS

508 — PREDICTING, FOR EACH AT LEAST ONE REQUIRED SERVICE METRIC, BY THE MACHINE LEARNING ALGORITHM, AN EXPECTED SERVICE METRIC VALUE PROVIDED BY THE INITIAL ALLOCATION ASSIGNMENT

510 — ADJUSTING, BY THE SEARCH ALGORITHM, THE INITIAL ALLOCATION ASSIGNMENT BASED ON A DIFFERENCE BETWEEN THE EXPECTED SERVICE METRIC VALUE AND THE CORRESPONDING AT LEAST ONE REQUIRED SERVICE METRIC VALUE

512 — ITERATIVELY REPEATING UNTIL EITHER: THE EXPECTED SERVICE METRIC VALUE PREDICTED FOR AN ADJUSTED ALLOCATION ASSIGNMENT IS WITHIN A PREDETERMINED DISTANCE OF THE CORRESPONDING AT LEAST ONE REQUIRED SERVICE METRIC VALUE FOR THE INTERVAL; OR A PREDETERMINED TIME HAS ELAPSED

514 — GENERATING, FROM THE ITERATIVELY ADJUSTED ALLOCATION ASSIGNMENTS, AN ALLOCATION ASSIGNMENT PLAN FOR THE PLURALITY OF TIME INTERVALS

Fig. 5 (cont.)

SYSTEM AND METHOD FOR PREDICTING SERVICE METRICS USING HISTORICAL DATA

FIELD OF THE INVENTION

The present invention relates generally to resource optimization, in particular to using combined search and predictive algorithms to schedule allocation of resources.

BACKGROUND OF THE INVENTION

Contemporary systems exist to handle the problem of resource allocation, such as computer system resource allocation or generating staffing requirements (e.g. how many agents are needed in each time interval) in a voice only (e.g. communications between people using only voice) environment. The setting of voice calls only has been the main environment in which contact centers (also known as call centers) have operated. In the voice only setting, agents can handle only one contact at a certain time and will be available to handle another call only once the current call has been completed. The voice setting is in fact a sub-problem of generating staffing requirements under the constraint of maximum concurrency equal to 1.

However, the constraint of maximum concurrency equal to 1 has been relaxed in the digital contact center, where, for example, agents are expected to be able to concurrently handle a plurality of communications over multiple channels such as web chat, email, and short message service (SMS). This major shift in the way work is distributed and handled has great implications on both the number (and cost) of agents required at the contact center, as well as on the quality of service provided to the contacting customers.

Existing systems are not designed to handle this new way of work, accounting for the need of an agent to divide their full attention across multiple customers at a time, and therefore a new approach is needed to address the problem of generating staffing requirements for contact center agents in the digital contact center, handling multiple concurrent contacts over a multitude of different digital channels, such as chat, email, WhatsApp, etc., as well as voice.

Many companies provide products that generate staffing requirements. These solutions, as well as the solutions provided by NICE Ltd., all rely on two main methods to approximate the needed staffing for a certain interval: the Erlang C formula, and simulations. These two methods have both been around for many decades, and while many improvements and adjustments have been made to them, in essence they are both bounded to the limitations of using average handling time (AHT) to approximate service level. While using these two solutions and relying on AHT has proved useful for many years, as seen before, in the digital and concurrent world these are not enough.

Both existing solutions lack the ability to capture the complexity of digital mediums, as well as the intricacies of different methods of using them, employed by different users. While in the past communications were limited to the voice medium, today a variety of channels are available. This new diversity in communication channels has opened the door to many new forms and methods of communication such as asynchronous communications, elevations between channels (e.g. a customer initially sending a chat message, but being later elevated to a voice call, perhaps because of the complexity of their problem), and many more. As a result, different users are using these channels in very different ways, resulting in very different meaning for the same volumes, for different tenants (e.g. the occupying company of a call centre). When trying to select an optimal concurrency value for different tenants, this approach makes it very hard to generalize a recommendation to all users.

SUMMARY

Embodiments of the invention may relate to a method for allocating resources for a plurality of time intervals, the method including: receiving a forecasted workload and at least one required service metric value for each of the plurality of time intervals; for each interval: applying a search algorithm to identify an initial allocation assignment; inputting the initial allocation assignment to a machine learning algorithm, wherein the machine learning algorithm has been previously trained on historic data of a plurality of past intervals; predicting, for each at least one required service metric, by the machine learning algorithm, an expected service metric value provided by the initial allocation assignment; adjusting, by the search algorithm, the initial allocation assignment based on a difference between the expected service metric value and the corresponding at least one required service metric value; iteratively repeating the applying, inputting, predicting, and adjusting operations until one of: the expected service metric value predicted for an adjusted allocation assignment is within a predetermined distance of the corresponding at least one required service metric value for the interval; or a predetermined time has elapsed.

According to an embodiment of the invention there is disclosed generating, from the iteratively adjusted allocation assignments, an allocation assignment plan for the plurality of time intervals.

According to an embodiment of the invention, resources are classified by at least one skill.

According to an embodiment of the invention, the forecasted workload includes a workload broken down into one or more required resource skills for each of the plurality of time intervals.

According to an embodiment of the invention the forecasted workload includes a volume of incoming communications.

According to an embodiment of the invention, at least one incoming communication is chosen from a list including: short message service (SMS), web chat, and email According to an embodiment of the invention, at least one required service metric is chosen from a list including: average speed of answer, service level agreement, abandoned percentage, chat latency, and maximum occupancy.

According to an embodiment of the invention the adjusting is based on a correction ratio determined by the equation:

$$\text{correction ratio} = \frac{(1 + \text{Expected Service Metric Value})}{(1 + \text{Required Service Metric Value})}.$$

According to an embodiment of the invention, the machine learning algorithm is one of: a regression algorithm, a deep learning algorithm; a neural network; a fully connected neural network; or a convolutional neural network.

According to an embodiment of the invention, there is disclosed a method for optimizing workforce management plans in environments concurrently handling a plurality of voice and non-voice communications channels for a plurality of skills in a given time interval, the method including:

receiving a workload and a required level of service; searching to identify an initial staffing assignment; predicting, by a machine learning algorithm, a predicted level of service expected for the initial staffing assignment, wherein the machine learning algorithm is trained on historic data of handling communications in past intervals; iteratively updating the staffing assignment based on a difference between the predicted level of service and the required level of service until: the level of service predicted for an updated staffing assignment is within a predetermined distance of the required level of service for the interval; or a time has elapsed.

According to an embodiment of the invention there is disclosed producing, from the iteratively updated staffing assignments, a staffing assignment plan for the plurality of time intervals.

According to an embodiment of the invention, a non-voice communication includes any of: short message service, email, integrated chat, or social media message.

According to an embodiment of the invention, the workload includes a workload broken down by one or more required skills for each of the plurality of time intervals.

According to an embodiment of the invention, the initial staffing assignment is selected based on at least one of: Erlang C formulas, simulation, workload calculation, or random sampling.

According to an embodiment of the invention there is disclosed a system for allocating resources for a plurality of given time intervals, the system including: a memory; and a processor configured to: receive a forecasted workload and at least one required service metric value for each of the plurality of time intervals; for each interval: apply a search algorithm to identify an initial allocation assignment; apply a machine learning algorithm to the initial allocation assignment to predict, for each at least one required service metric, an expected service metric value provided by the initial allocation assignment; adjust the initial allocation assignment based on a difference between the expected service metric value and the corresponding at least one required service metric value; iteratively repeat the applying, predicting, and adjusting operations until either: the expected service metric value predicted for an adjusted allocation assignment is within a predetermined distance of the corresponding at least one required service metric value for the interval; or a predetermined time has elapsed.

According to an embodiment of the invention, the processor is configured to generate, from the iteratively adjusted allocation assignments, an allocation assignment plan for the plurality of time intervals.

According to an embodiment of the invention, the machine learning algorithm has been previously trained on historic data of a plurality of past intervals.

According to an embodiment of the invention, the processor classifies resources by at least one skill.

According to an embodiment of the invention, the received forecasted workload includes a workload broken down into at least two required resource skills for each of the plurality of time intervals.

According to an embodiment of the invention, the processor is configured to adjust the initial allocation assignment based on a correction ratio determined by the equation:

$$\text{correction ratio} = \frac{(1 + \text{Expected Service Metric Value})}{(1 + \text{Required Service Metric Value})}.$$

In contrast to existing methods, embodiments of the invention may provide an easy and clear way to account for different usage modes as well as other differences between tenants, simply through training and developing recommendations on tenant specific data.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

FIG. 5 is a flow diagram of a method according to an embodiment of the invention;

Figure 1:
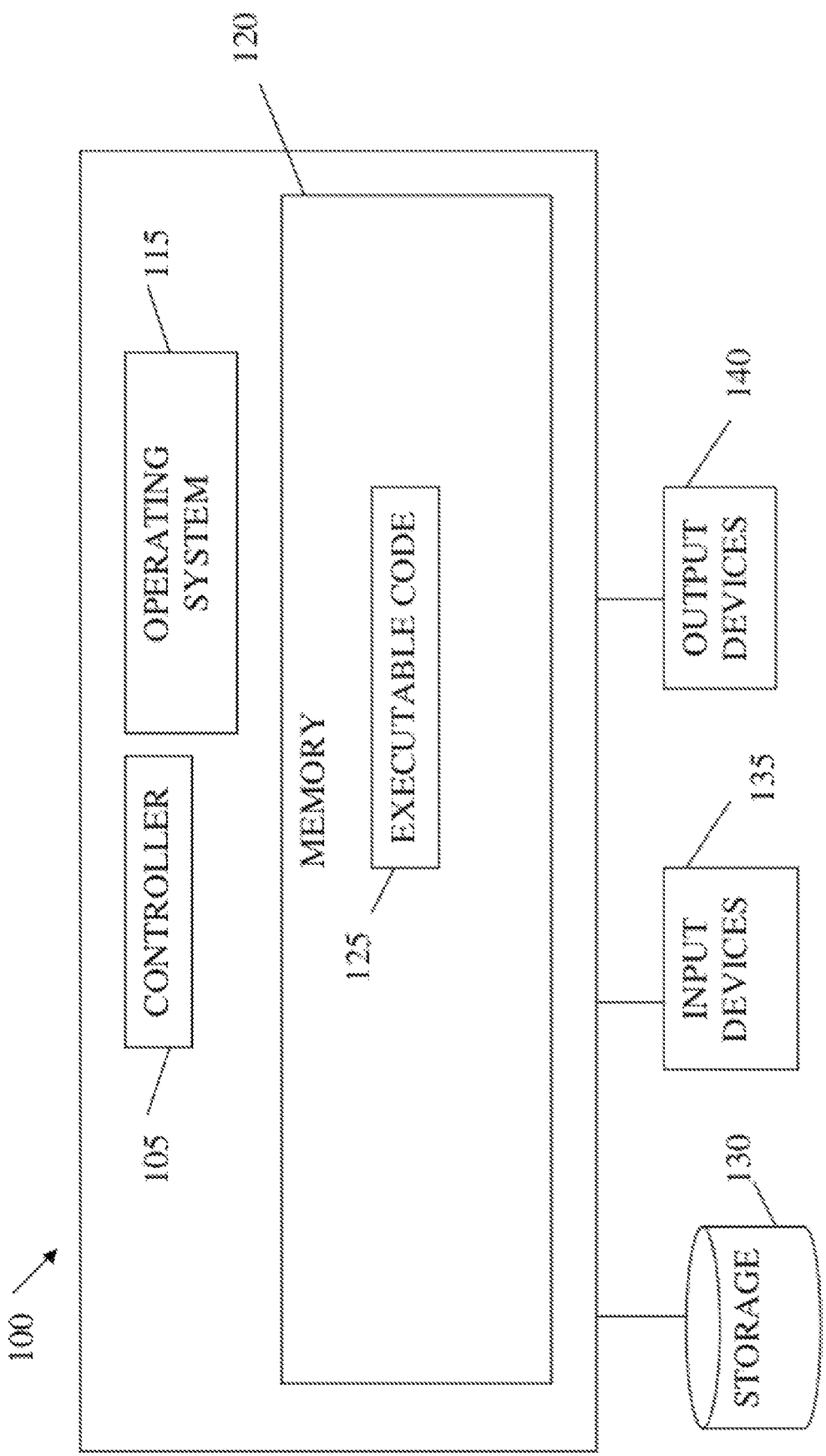
FIG. 1 is a block diagram of a system according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Embodiments of the invention relate generally to a novel method for approximating the quality of service provided by a set of agents for a specific time interval or time period. To predict while accounting for the great variability in service times, as well as their dependency on a myriad of different time dependent variables, a machine learning algorithm, e.g.

a deep learning neural network, is trained on the data in a novel fashion. Furthermore, a novel search approach is applied over possible inputs to the trained model, leveraging the trained model as a means for selecting the optimal staffing requirement, so that the net staffing will be as low as possible while providing the required service levels. In some embodiments this may improve the technologies of machine learning. This algorithm differs from other existing methods in that it utilizes a resource unavailable until now, the historical data on workload, agents, and the contact center for service metric prediction.

As used herein, "Call Center" may refer to a centralized office used for receiving or transmitting a large volume of enquiries by telephone. An inbound call center may be operated by a company (e.g. a tenant) to administer incoming product or service support or information enquiries from consumers.

As used herein, "Contact Center" may refer to a call center which handles other types of communications other than voice telephone calls, for example, email, message chat, SMS, etc. Reference to call center should be taken to be applicable to contact center.

As used herein, an "Agent" may be a contact center employee that answers incoming contacts, handles customer requests and so on.

As used herein, a "Customer" may be the end user of a contact center. They may be customers of the company that require some kind of service or support.

As used herein, "Work Force Management (WFM)" may refer to an integrated set of processes that a company uses to optimize the productivity of its employees. WFM involves effectively forecasting labor requirements and creating and managing staff schedules to accomplish a particular task on a day-to-day and hour-to-hour basis.

As used herein, "Staffing Requirements" may refer to the required amount of personnel (e.g. agents) needed at a contact center to handle expected contacts in accordance with quality-of-service metrics.

As used herein, "Workload" may refer to the overall amount of work to be handled or being received. In the example of a call center, workload may be work arriving at the call center. In other examples, e.g. where resources are computer hardware or software resources, workload may be measured differently. Workload may be calculated as a factor of volumes, average handling time, and customer latency, as well as others. Workload may be broken down into one or more skills, e.g. a workload may be given which is broken down or otherwise characterized by a workload for a first skill and a workload for a second skill.

As used herein, "Volume" may refer to a number of contacts coming into a contact center.

As used herein, "Average Handling Time (AHT)" may refer to the average time from start to finish of a customer interaction. AHT may be an important factor in understanding how much work (e.g. workload) the contact center is handling/will handle.

As used herein, "Customer Latency" may refer to a measure describing how long on average a customer takes to respond to an agent after the agent has replied. This measure may be an important factor in quantifying the workload in the digital contact center.

As used herein, "Service Metrics" may refer to key performance indicators (KPIs) designed to evaluate the experience of the contacting customers and the quality of service provided to them, in terms of work force and agent availability. These KPIs can include average speed of answer, service level and customer latency amongst others. When the contact center is understaffed, service metrics may be lower than defined, and when over staffed, higher. Each user may select the service metrics that are important for their contact center and may define values based on their preferences. These may be referred to as "Service Targets" or "Required Service Metrics" in the sense that they are a required target to be achieved by any allocation assignment.

As used herein, "Wait Time" or "Average Speed of Answer (ASA)" may refer to a service metric used for voice calls detailing how long customers waited until their call was picked up by an agent.

As used herein, "Service Level Agreement (SLA)" may refer to a service metric, similar to the above ASA. A service level agreement may allow a user to define a percentage of users answered within a selected time frame, e.g. 30 minutes. The more general "service level" or "level of service" may at times be used herein to refer to a quality of service as measured by one or more service metrics, which may include SLA.

As used herein, "Abandoned percentage" may refer to a service metric quantifying the possibility that as ASA grows, more customers get tired of waiting and hang up whilst waiting for an agent.

As used herein, "Skills" may refer to a method of compartmentalizing agent training and specialty into different useful categories, e.g. technical support, financial inquiries and so on. Skills may also be used as a means of representing different channels of communication such as voice, chat etc., where tech_support_voice could be one skill and tech_support_chat could be another.

As used herein, "Under/Over staffing" may refer to situations when the contact center is not working effectively, and money is being wasted. When overstaffed, customers are served beyond the defined service metrics, agents are not fully utilized, and money is wasted. When understaffed, customers are served poorly in terms of agent availability, and thus other important processes in the contact center cannot happen.

As used herein, "Forecasting Period" may refer to data generated for a selected period, often starting from the present or from the end time of the current schedule.

As used herein, "Concurrency" may refer to the fact that in the digital contact center agents serving customers over digital channels will often find themselves working on more than one contact at a time. Working concurrently on multiple contacts can both improve agent utilization as well as degrade the service provided to the contacting customer. Concurrency is often defined by the user creating the staffing requirements as a fixed value for the maximum amount of contacts an agent should work on.

As used herein, "Dynamic Concurrency" may refer to the phenomenon that as the workload, intensity and complexity of a specific work item varies, as well as the overall topics of customer requests changing, so too does the agent's ability to handle different levels of concurrency. The present approach presents a search over a machine learning model that evaluates these parameters and de facto returns an implicit concurrency level.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as low-level action data, output data, etc.

Executable code 125 may be any application, program, process, task, or script. Executable code 125 may be executed by controller 105 possibly under control of operating system 115. For example, executable code 125 may be or execute one or more applications performing methods as disclosed herein, such as a machine learning model, or a process providing input to a machine learning model. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Embodiments of the invention may involve training a machine learning model. The machine learning model may be a deep learning model inspired by but differing from the structure of an organic human brain, otherwise known as a neural network. Where it is understood that deep learning models are a subset of machine learning models, further reference herein to machine learning should be understood as referring also to deep learning models.

A machine learning model may be trained according to some embodiments of the invention by receiving as input at least one of: volumes over different skills and channels; average handling time (AHT); customer latency; and number of agents assigned and corresponding skill composition. These data may represent historical data over past periods or intervals, where the data for each interval is a training sample. For each past interval the model may receive the actual workload (volumes, AHT, customer latency) as well as the available personnel. The output of the model may be the expected service metrics measured for this historical interval, such as service level, ASA, chat latency and/or general metrics for different channels. In an embodiment where the resource is another resource, for example a computer resource, the past interval training data may be loads or usage for computer resources.

Embodiments of the invention may train the machine learning model as essentially a regression model with multiple inputs and outputs. After the model is trained it may be utilized by a search algorithm.

Figure 2:
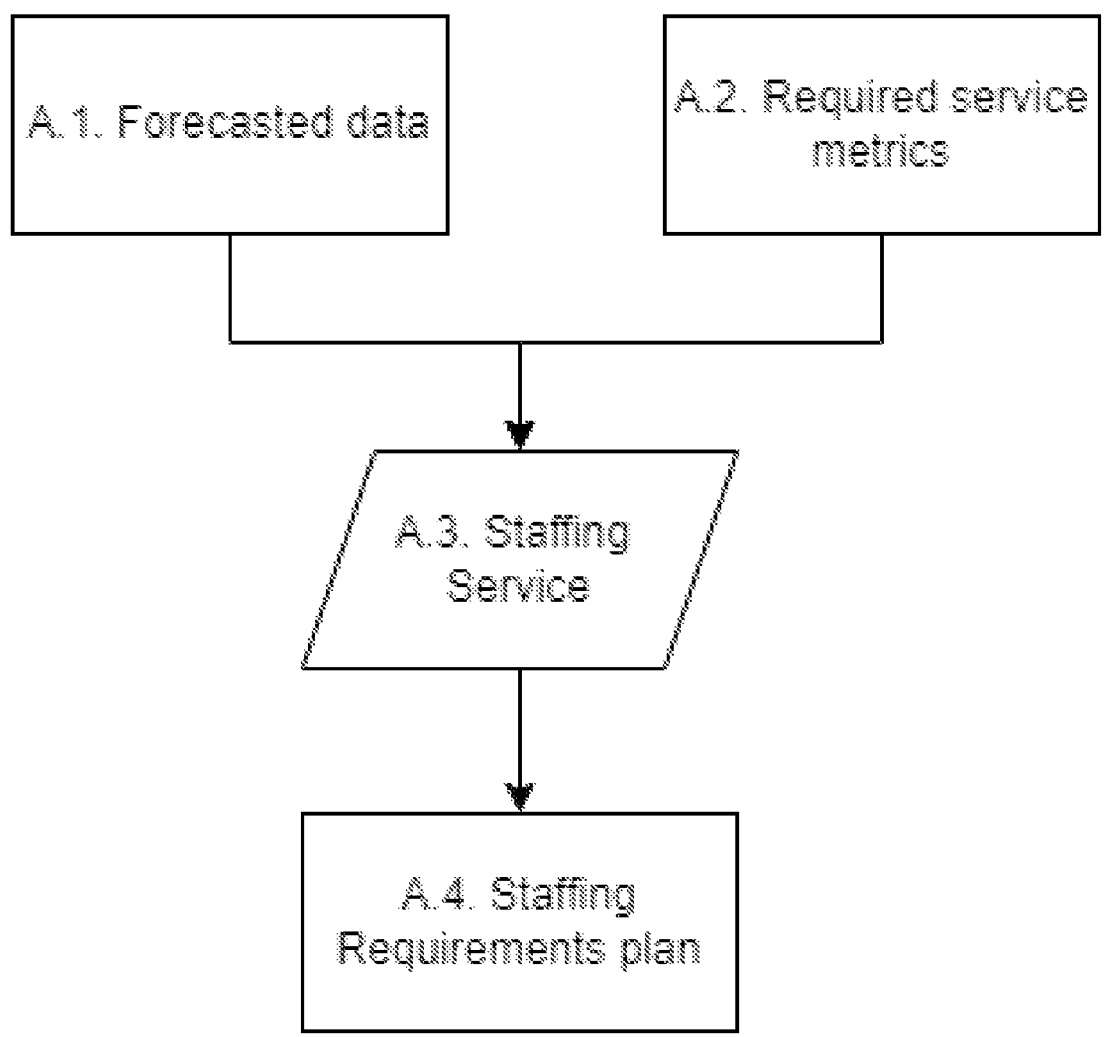
FIG. 2 is a block diagram of a method according to an embodiment of the present invention.

With reference to FIG. 2, embodiments of the invention provide a method for providing staffing schedules responsive to predicted requirements.

In the following diagrams, parallelograms represent processes, rectangles represent data and rhombuses represent decisions based on parameters and data. Parameters are represented as data as well.

Embodiments of the invention may include providing/receiving forecast data (block A.1). Forecasted data may take the shape of (|intervals|X|skills|X|features|), for example a vector or matrix with a number of entries/cells corresponding to a product between the number of intervals, skills and features. Forecasted data may be a time series depicting the workload relevant to the resource; e.g. the workload the call center will need to handle. This multivariate time series may include features such as volume (number of contacts across different channels), AHT and average customer latency (average time elapsed between agent response and customer replying). The workload may be divided across different communications channels, and these communication channels may be non-voice communication channels (e.g. not a spoken telephone call) chosen, for example, from a list including any of: short message service, email, web chat, integrated chat, or social media message. Web chat and/or integrated chat may refer to a communication functionality coded into or otherwise available (e.g. as a widget) as part of a website or app, for example available on a customer service section of a company website. The forecasted data/workload may be broken down by or divided across one or more skills characterizing the resources, e.g. in a call/contact centre the workload may be broken down across agents having skills in refund requests, general queries, and customer complaints. The above features are examples and forecasted data is not limited to these or these alone. Features may be predicted for every interval during the forecasting period, and for each skill separately.

Embodiments of the invention may include providing/receiving at least one required staffing service metric value (block A.2). Required staffing service metrics may take the shape of (|skills|X|service metrics|). Required staffing service metrics may represent the minimal service level a user could accept. A user may set values for all variables. Possible metrics may include, for example, SLA (e.g., 80% of calls should be answered within 30 seconds) and chat latency (e.g., agents take 60 seconds to respond to a chat message on average).

Accordingly, a method and/or system according to embodiments of the invention may include as a first step receiving a forecasted workload and at least one required service metric value for each of the plurality of time intervals.

Figure 3:
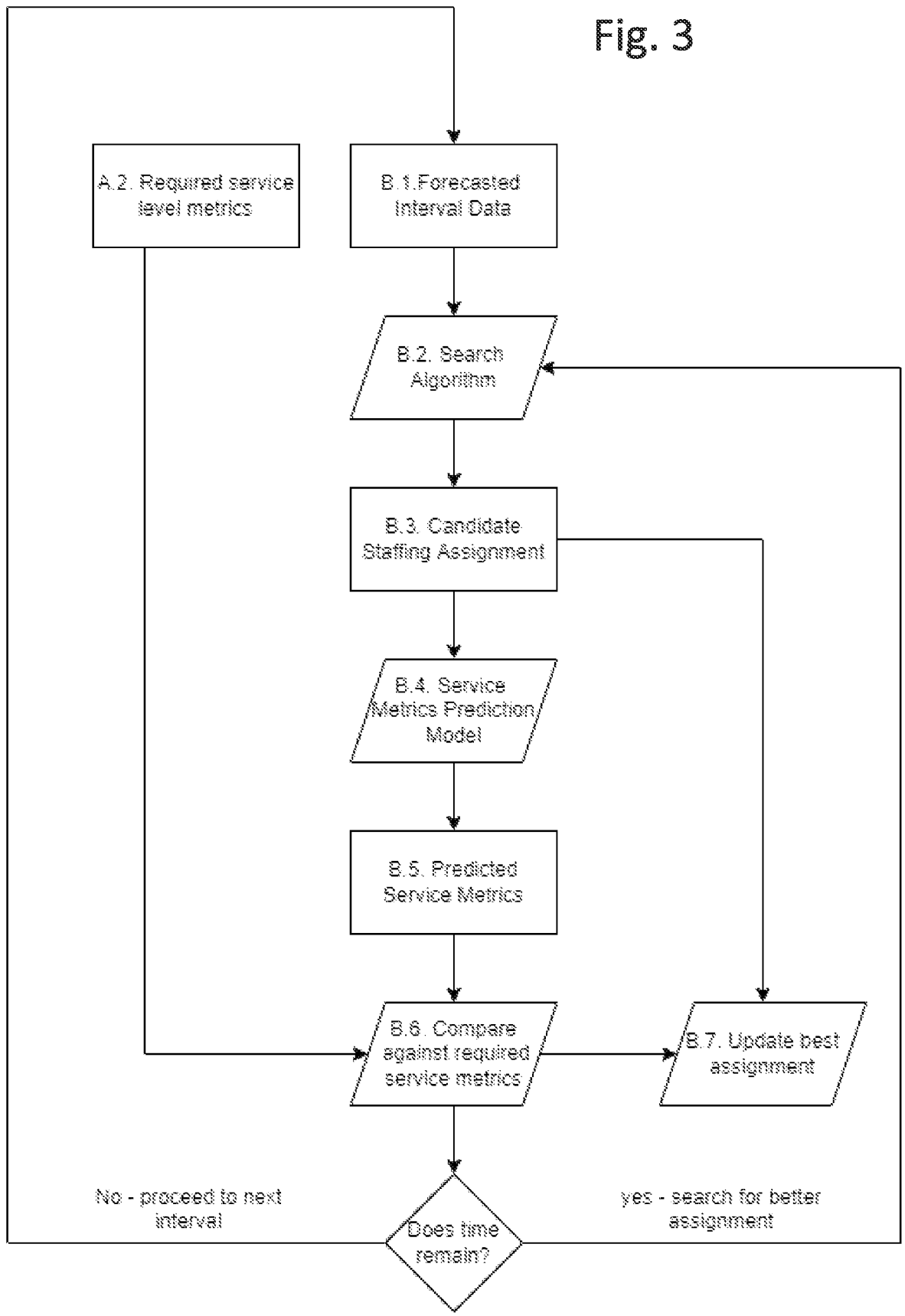
FIG. 3 is a block diagram showing a focused view of elements of FIG. 2.

FIG. 3 represents a focused view of the staffing service and requirements plan (blocks A.3 and A.4) shown in FIG. 2, and describes an algorithm according to embodiments of the invention for creating staffing requirements for a single interval.

Forecasted interval data (block B.1) may take the shape (|skills|X|features|) and may represent a single time element from the forecasted data of A.1. Forecasted interval data is the workload that needs to be handled during a particular interval. For each interval, an iterative process may be performed, as will be described herein further below.

A search algorithm (block B.2) may suggest an initial/candidate staffing or assignment requirement (block B.3) for a specific interval: for example, a method and/or system according to embodiments of the invention may include, for each interval, applying a search algorithm to identify an initial allocation assignment. An example search algorithm is described in detail below with respect to FIG. 4. The initial staffing/allocation assignment may have the shape (|skills|) and may represent a count vector of how many agents are suggested for each skill. A candidate staffing assignment, after one or more iterative updates as will be described further herein below, may become a single item/element in the time series of A.4 representing the full staffing requirements plan for all intervals. In other embodiments a search algorithm may be over assignments of other resources, such as computer resources.

A service metric value expected to be achieved by the initial staffing requirement (block B.3) handling the forecasted workload (block B.1) may then be predicted using a machine learning service level prediction model (block B.4), for example by inputting the initial allocation assignment to a machine learning algorithm, wherein the machine learning algorithm has been previously trained on historic data of a plurality of past intervals. Embodiments of the invention relate to a novel approach for using neural networks to predict the service metrics which may be provided in an interval by a certain staffing for a particular workload. Inputs to this model (e.g. the neural network) may include the forecasted workload (block B.1), and a (at least initial) staffing assignment (block B.3), and could be extended to include any other relevant input. For example, the model may receive as input a forecasted workload (e.g. a workload for future intervals, which may be broken down by skill) and a required service metric value. The machine learning model may provide a prediction: the output of this trained algorithm may be service metric predictions (e.g. a particular value) for each skill (block B.5). For example, a method and/or system according to embodiments of the invention may include predicting, for each at least one required service metric, by the machine learning algorithm, an expected service metric value provided by the initial allocation assignment.

Predicted service metrics (block B.5) as output by the service metrics prediction model (block B.4) (e.g. "expected" service metrics expected to be achieved by the assignment) may have the shape (|skills|X|service metrics|) and may represent predicted values for each service metric specified by a user. These values may represent the fit of the suggested staffing to the workload during the specific interval. For example, if the staffing assignment suggested as a candidate for the interval is insufficient to handle a certain workload, then the predicted values will be low.

The predicted service metric value(s) for the interval across all skills and service metrics as received by the machine learning service metrics prediction model may then be compared (block B.6) to the at least one required service metric value(s) (block A.2) as provided by the user. A difference between the required service metrics (block A.2) and the predicted service metrics (block B.5) may be calculated, for example by an element wise application of the subtraction operator (−). The result of this calculation may be a matrix of the same shape as in both blocks A.2 and B.5. Cells in the resulting matrix with a positive value may imply a specific skill is overstaffed. Cells with a negative value may imply a certain skill is under staffed. Cells with a value close to zero imply that the skill is staffed correctly. These values may be used to evaluate the staffing in each skill, as well as the overall fitness of the assignment.

After comparison, the candidate staffing requirement most fitting the required service metrics may be updated (block B.7), for example, by adjusting the initial allocation assignment based on a difference between the expected service metric value and the corresponding at least one required service metric value. If the current candidate staffing assignment is predicted to produce a better outcome (measured in terms of service metrics) than the previously suggested best candidate staffing assignment, then the best staffing assignment may be updated. Comparison may result in a scalar number representing how good a staffing assignment is. This scalar may be calculated as a weighted average of the difference/distance between the required and predicted service levels weighted by the volume of each skill, so the grade is consistent with the service level experienced by most users. The best candidate staffing assignment may be the assignment to supply the best service level at the lowest cost.

If time remains, the algorithm may iterate again, using the difference as expressed/captured by the correction factor between the required and the predicted service levels as a means of generating an improved candidate staffing assignment which, after several repetitions, may make the predicted service metrics converge to the required service level metrics. The optimal candidate for the interval may be set as the staffing requirements for this interval. If time does not remain, or if an optimal assignment (for example, within an acceptable predetermined distance range or ±tolerance of the required service level metrics) has been found for the interval, the algorithm may accept the candidate staffing requirement for the current interval and may proceed to the next interval. For example, the search algorithm may adjust an initial allocation assignment based on a difference between the expected service metric value and the corresponding at least one required service metric value and may iteratively repeat the previous applying, inputting, predicting, and adjusting operations until one of: the expected service metric value predicted for an adjusted allocation assignment is within a predetermined distance of the corresponding at least one required service metric value for the interval; or a predetermined time has elapsed. A predetermined distance may be a positive scalar value characterizing a "closeness" of the expected service metric value to the target service metric value. For example, a predetermined distance may be selected as within 0.3 of a required service metric value of 10, and thus an assignment which is predicted to achieve a corresponding service metric value of 6 is not within the predetermined distance (e.g. |10−6|=4»0.3): however, an updated assignment which achieves a value of 10.2 for that assignment is within the predetermined distance (|10−10.2|=0.2<0.3).

A staffing requirements plan may be output (block A.4), which may have the shape (|intervals|X|skills|), and which may, for each interval, represent how many agents are needed in each skill. In other words, the staffing requirements plan is the sequence of interval requirements generated for all intervals within the forecasted period. The staffing requirements plan may be used to create a schedule of actual agents. For example, a method and/or system according to embodiments of the invention may include generating, from the iteratively adjusted allocation assignments, an allocation assignment plan for the plurality of time intervals.

Figure 4:
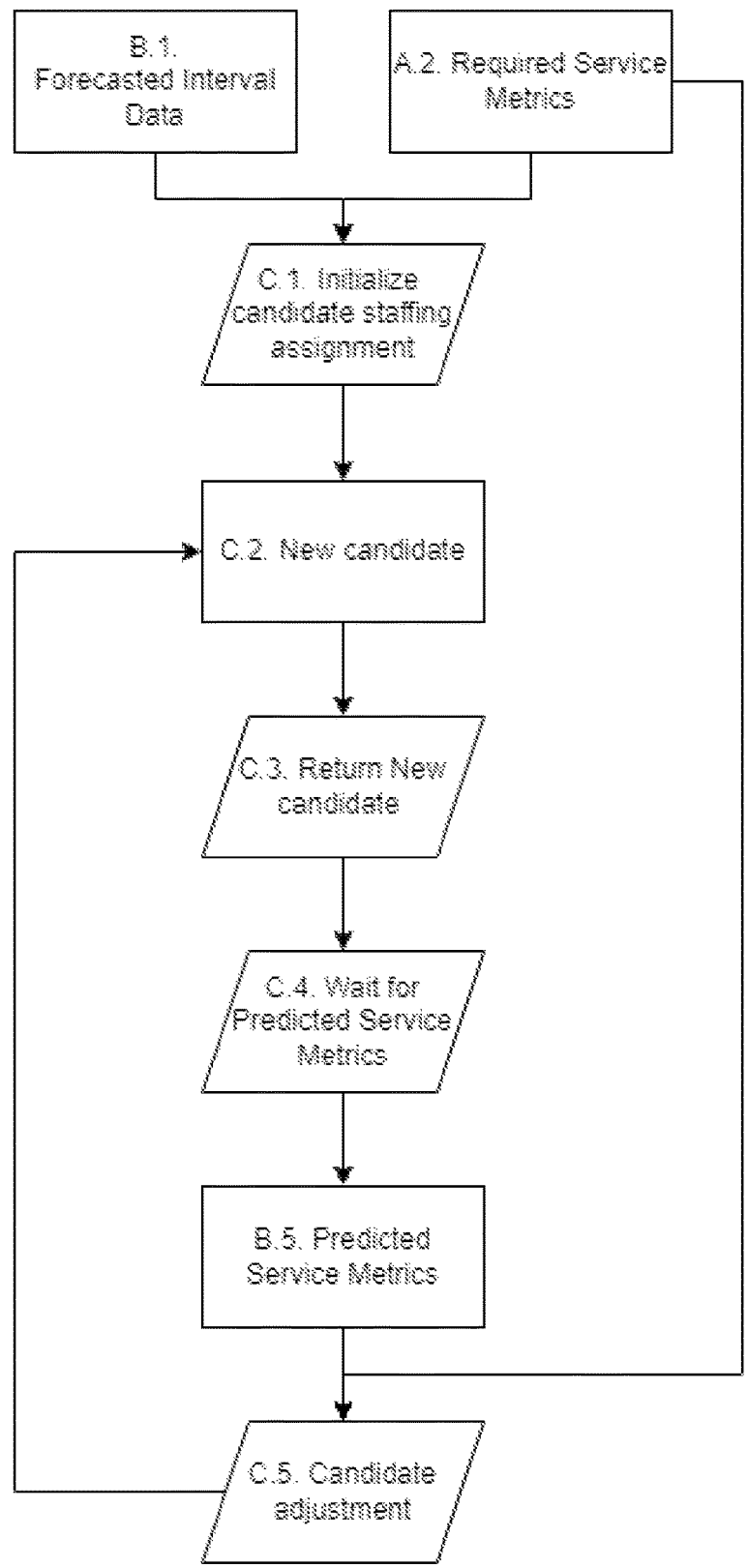
FIG. 4 is a block diagram showing a focused view of elements of FIG. 3.

FIG. 4 shows a focused view of the search algorithm shown in block B.2 of FIG. 3. The search algorithm may suggest the next candidate/potential staffing assignment based on the difference between the required service metrics and the predicted service metrics for the previous assignment. Using forecasted interval data (block B.1) and the required service metrics (block A.2) an initial staffing assignment may be generated (block C.1). A staffing assignment may have the shape (|skills|), and a positive entry in each cell may represent the number of agents required for the interval. A staffing assignment may also be referred to as a staffing option, or as an allocation assignment. In order to begin the search, the search algorithm may require a starting point, e.g. an initial staffing assignment. The initial staffing assignment could be generated by different methods, for example, random sampling, Erlang C formulas, simulations, etc. The initial staffing assignment may also be generated by a workload calculation by taking the total time needed (e.g. Volume*AHT) and dividing by the total time of one of the intervals: for example, for a volume of two calls that take 7.5 minutes each, the total is 2*7.5=15, then dividing by the length of a 15 minute interval, a workload of 1 agent may be obtained, e.g. 1 agent is required to handle the workload (given two calls of 15 minutes, or one call of 30 minutes, a workload of two agents is obtained). This initial staffing assignment, generated by any of the described means, may then be iteratively improved, as will be described herein.

The search algorithm may then enter a loop, and the new candidate (block C.2) may be returned (block C.3) to the calling procedure specified in FIG. 3. As with the initial staffing assignment, the new candidate may have the shape (|skills|), and a positive entry in each cell may represent the number of agents suggested for the interval. The newly suggested candidate staffing assignment is returned to the staffing service (A.3), shown in FIG. 3 as candidate staffing assignment (block B.3).

The search algorithm may now wait (block C.4) for the predicted service metric value(s) (block B.5) expected to be achieved for the staffing assignment. The search algorithm may receive either a stop signal on which the search will terminate, or the predicted service metric value(s) for the suggested/candidate assignment. The predicted/expected service metrics may have the shape (|skills|X|service metrics|). Predicted service metrics may be generated for each of the candidate staffing options suggested by the search algorithm and may be passed back to the search algorithm if time remains (see the bottom of FIG. 3).

Once received, the search algorithm may adjust the initial allocation assignment. For example, the search algorithm may use the predicted service metrics (block B.5) together with the required service metrics (block A.2) to calculate an adjustment factor and adjust (block C.5) the previous candidate. For example, a method and/or system according to embodiments of the invention may include adjusting, by the search algorithm, the initial allocation assignment based on a difference between the expected service metric value and the corresponding at least one required service metric value. The adjustment factor may be a vector and may have the shape (|skills|), and may represent how to adjust the staffing assignment to produce a candidate for the next iteration. Each cell in the adjustment vector may contain values used to increase (greater than 1) or decrease (between 0-1) the previous staffing assignment. The adjustment factor may result in the number of agents needed for a specific skill being increased if service metrics have not been met in a previous iteration, and decreased when service metrics have been exceeded (which may not be efficient or cost effective).

For each metric used to evaluate a skill, a ratio may be calculated. For metrics where a lower score is better, such as ASA (wait time until answer), a correction ratio may be defined as follows:

$$\text{correction ratio} = \frac{(1 + \text{Predicted Metric Value})}{(1 + \text{Required Metric Value})}$$

wherein a predicted (service) metric value may also be referred to as an expected (service) metric value. Similarly, a required (service) metric value may also be referred to as a target (service) metric value.

For example, having an ASA value higher than required implies that the contact center is understaffed for this skill. The correction ratio in this case will be larger than 1. In the opposite case, the correction will be lower than one. The correction value may be calculated for each skill, where skills with more than one metric may average the correction ratio across service metrics. The resulting vector will have an entry for each skill with a value larger than 1 for skills where more agents are required, and a value between 0-1 if the number of agents in the skill should be reduced.

For metrics where a higher value is better, such as SLA, the correction ratio will simply be the inverse correction ratio, i.e. correction ratio$^{-1}$. Thus, a vector adjustment factor may include scalar correction ratios for each skill.

To calculate a new candidate for the next interval, an element-wise product may be performed between the previous candidate vector and the adjustment factor vector. The result of this product may be an increase or decrease in the suggested workforce, at the skill level, for the new candidate staffing assignment.

FIG. 5 shows a method 500 for allocating resources for a plurality of given time periods or intervals. While in one example embodiment resources may be workers such as contact center agents having desired skills, resources may also be any resource for which provisioning over a series of time intervals (next 20 minutes, next hour, next day, coming week, etc.) is required, for example: computer servers; data storage volumes; and power sources in a power grid. Resources may be classified by skills. For example, where the resources are workers such as agents in a contact center, skills may include technical expertise and financial expertise. Where the resource is a power source for example, the classifying skills (or attributes) may relate to a renewable status, a power output etc.

Method 500 may include receiving (502) a forecasted workload and at least one required service metric value for each of the plurality of time intervals. A forecasted workload may be forecasted by means known in the art, for example by simulation. A required service metric value may be a quantification of a level of service to be met based on one or more considerations such as demand, cost, and practicality.

Method 500 may include, for each period interval, applying (504) a search algorithm to identify an initial allocation assignment for that period or interval. The search algorithm may be a search algorithm as described by block B.2 and in FIG. 4, or another suitable search method. The initial allocation assignment may for example be a candidate staffing option. The initial allocation assignment may be selected based on random sampling, or may be a more informed selection based on Erlang C formulas, workload calculation, or simulation. In examples with other resources such as computer resources, allocation assignments may be relevant to assignment of those other resources.

Method 500 may include, for each interval, inputting (506) the initial allocation assignment to a machine learning algorithm. The machine learning algorithm may have been previously trained on historic data of a plurality of past intervals. The machine learning algorithm may be a service metrics prediction model as described by block B.4.

Method 500 may include, for each interval, predicting (508), for each at least one required service metric, by the machine learning algorithm, an expected service metric value provided by the initial allocation assignment. For example, based on training data of historic intervals, the machine learning algorithm may predict that an initial allocation assignment will achieve a particular value for a particular service metric.

Method 500 may include, for each interval, adjusting (510), by the search algorithm, the initial allocation assignment based on a difference between the expected service metric value and the corresponding at least one required service metric value.

Method 500 may include, for each interval, iteratively repeating (512) until for example the expected service metric value predicted for an adjusted allocation assignment is within a predetermined distance of the corresponding at least one required service metric value for the interval; or a predetermined time has elapsed.

Method 500 may optionally include generating (514), from the iteratively adjusted allocation assignments, an allocation assignment plan for the plurality of time intervals. For example, a schedule or rota may be generated detailing how the resources are to be distributed across the intervals to achieve an optimal allocation for the forecasted workload.

An embodiment of the invention may also relate to a method for optimizing workforce management plans in environments concurrently handling a plurality of voice and non-voice communications channels for a plurality of workforce skills, in a given time interval. The method may include receiving a forecasted workload and a required level of service. A level of service may, for example, include one or more service metrics, and as such a level of service may include a required service level within the meaning of service level agreement (SLA), i.e. a predetermined percentage of customers answered in a predetermined time period. The method may include searching to identify an initial staffing assignment. The method may include predicting, by a machine learning algorithm, a predicted service level expected for the initial staffing assignment. The machine learning algorithm may have been previously trained on historic data of handling communications in past intervals. The method may further include calculating a difference between the predicted level of service and the required level of service. The method may further include iteratively updating the initial staffing assignment based on the calculated difference until either: the level of service predicted for the updated staffing assignment by the machine learning algorithm is within a predetermined distance of the required level of service for the interval; or a predetermined time has elapsed.

Figure 6:
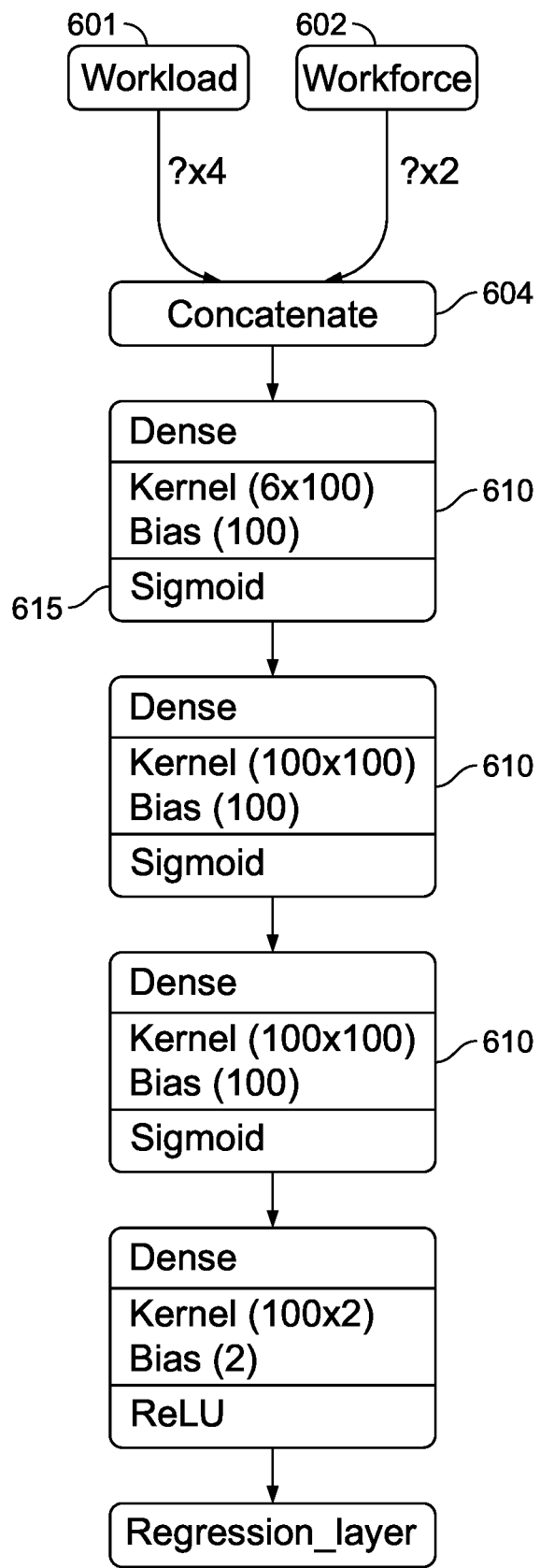
FIG. 6 is a diagram showing the structure of a neural network according to an embodiment of the present invention.

With reference now to FIG. 6, a machine learning algorithm employed by embodiments of the invention is discussed in detail. Embodiments of the invention suggest a novel method of predicting the service level using machine (or deep) learning predictors trained on historical data to produce accurate and personalized service metric predictions. According to embodiments of the invention, a model is trained to predict the service metrics in a particular interval based on the forecasted workload and the available agents, as well as other features that might include time of day, agent proficiency, and so on.

By analysing historical data intervals, three main elements may be calculated:

Workload: the workload which came into the contact center during a specific interval.

Actual staffing: The actual staffing is derived from the workforce working at the contact center at the time.

Service metrics: for each skill, depending on the channel, different service metrics are calculated. ASA for example would be calculated as the average time waited by customers on a voice skill until an agent answered the call.

Workload and actual staffing may serve as the main inputs to the machine learning model. The model may then be trained on historical intervals to predict the service metrics defined for each skill depending on the workload and the available personnel.

FIG. 6 describes an example machine learning model architecture 600, worked through for a two skill scenario. The model may have an input layer, which may receive the workload 601 and actual staffing (workforce) 602 for each skill, e.g. the expected volume, average handling time and number of agents for each skill. These inputs may be concatenated (604).

The input may be propagated through to a sequence of standard neural network dense layers 610, each followed by a sigmoid activation 615. Dense layers (also known as fully connected layers) are connected to each other, see FIG. 7. Activation functions may be used as switches determining the flow of information within the model. Activation functions may also be called non-linearities, as they allow stacked linear layers to model complicated non-linear problems. A sigmoid function is a bounded, differentiable, real function that is defined for all real input values and has a non-negative derivative at each point and exactly one inflection point. The function is common in deep learning architectures as it transforms all input values to values between 0 and 1. The sigmoid function is described by the expression:

$$S(x) = \frac{1}{1+e^{-x}} = \frac{e^x}{e^x + 1}$$

The final layer may be a dense layer with a ReLU activation, trained to predict the service metric of each skill. The rectified linear unit (ReLU) activation function is a piecewise linear function that outputs the input directly if it is positive, otherwise it will output zero. It has become the default activation function for many types of neural networks because a model that uses it is easier to train and often achieves better performance. The ReLU activation function is defined as:

$$f(x) = \begin{cases} x & \text{if } x > 0, \\ 0 & \text{otherwise} \end{cases}.$$

The output of model 600 may be, for each skill, value predictions of the different service metrics, providing a predicted/expected service metric value(s) which can be leveraged by a search algorithm according to embodiments of the invention to identify an optimal staffing assignment.

As an example, for a certain past interval with two skills, a volume of 100 and 200 interactions (e.g. calls) for each skill respectively, an AHT of 240 and 180 seconds and a staffing of 10 agents and 100 agents respectively, the input vector may be [100, 200, 240, 180, 10, 100].

Given that for the first skill, 10 agents is far from enough agents to serve properly, it could be expected that the ASA metric will have a very high (e.g. bad) value. Since 100 agents is much more than needed for skill two, it could be expected that the ASA value will be very low. The output vector in this case could be [90, 8], meaning customers waited 90 seconds on average until being answered by an agent for skill 1, and 8 seconds for skill 2.

Below are example simulation results for a two skill scenario, using ASA as a service metric. All results are reported in pairs, one value for each skill. The algorithm is run on one time interval, and the output of the process will be the staffing requirements for this interval. In the scenario simulated below, the contact center will have to handle a volume of 100, 200 interactions (calls) for each skill respectively, and meet an average handling time (AHT) of 240, 180 seconds respectively. The initial candidate (block C.1, FIG. 4) can be seen on line 4 of the simulation printout. The initial candidate may be chosen by random sampling and allowed to converge by repeated iterations, or a more informed starting point can be chosen based on Erlang C formulas or simulation. Every iteration the model is used to generate a prediction of the service metric for each skill. Using the target and predicted metric value (ASA) for each skill, a correction factor is calculated for each skill, with the number of agents by which to increase or decrease each skill. A new candidate is created using the previous candidate and the adjustment factor. The candidate with predicted service metrics closest to the required service metrics will be used as the staffing requirement for this interval.

Table 1 below depicts example simulation results for a two skill scenario, using ASA as a service metric.

TABLE 1

Target service metric ASA: [30, 30]
Call volume: [100 200]
Call handling time (aht): [240 180]
Initial candidate: [24. 68.]
Iteration 0
Predicted service metric (ASA): [46. 26.]
adjustment: [37.49 −7.57]
Candidate: [24. 68.]
New candidate: [61.49 60.43]
Iteration 5
Predicted service metric (ASA): [25. 37.]
adjustment: [−1.09 11.03]
Candidate: [42.73 53.48]
New candidate: [41.64 64.51]
Iteration 10
Predicted service metric (ASA): [26. 27.]
adjustment: [−0.4 −0.57]
Candidate: [40.2 65.37]
New candidate: [39.8 64.8]
Iteration 15
Predicted service metric (ASA): [31. 28.]
adjustment: [ 2.5 −0.17]
Candidate: [37.64 67.49]
New candidate: [40.14 67.31]
Iteration 20
Predicted service metric (ASA): [31. 27.]
adjustment: [2.04 −0.23]
Candidate: [41.44 65.55]
New candidate: [43.48 65.32]
Iteration 25
Predicted service metric (ASA): [29. 28.]
adjustment: [−0.04 −0.1]

TABLE 1-continued

Candidate: [44.38 63.67]
New candidate: [44.35 63.57]
Iteration 30
Predicted service metric (ASA): [24. 25.]
adjustment: [−0.26 −0.3]
Candidate: [45.56 65.13]
New candidate: [45.3 64.83]
Iteration 35
Predicted service metric (ASA): [25. 27.]
adjustment: [−0.17 −0.15]
Candidate: [44.01 63.59]
New candidate: [43.84 63.44]
Iteration 40
Predicted service metric (ASA): [27. 17.]
adjustment: [−0.09 −0.66]
Candidate: [43.1 64.75]
New candidate: [43.01 64.09]
Iteration 45
Predicted service metric (ASA): [31. 20.]
adjustment: [0.99 −0.45]
Candidate: [43.46 63.19]
New candidate: [44.44 62.74]
Iteration 50
Predicted service metric (ASA): [19. 25.]
adjustment: [−0.29 −0.17]
Candidate: [43.74 63.7]
New candidate: [43.45 63.53]
Iteration 55
Predicted service metric (ASA): [28. 26.]
adjustment: [−0.05 −0.14]
Candidate: [42.8 63.04]
New candidate: [42.75 62.91]
Iteration 60
Predicted service metric (ASA): [21. 25.]
adjustment: [−0.21 −0.15]
Candidate: [43.29 63.54]
New candidate: [43.08 63.39]

Figure 7:
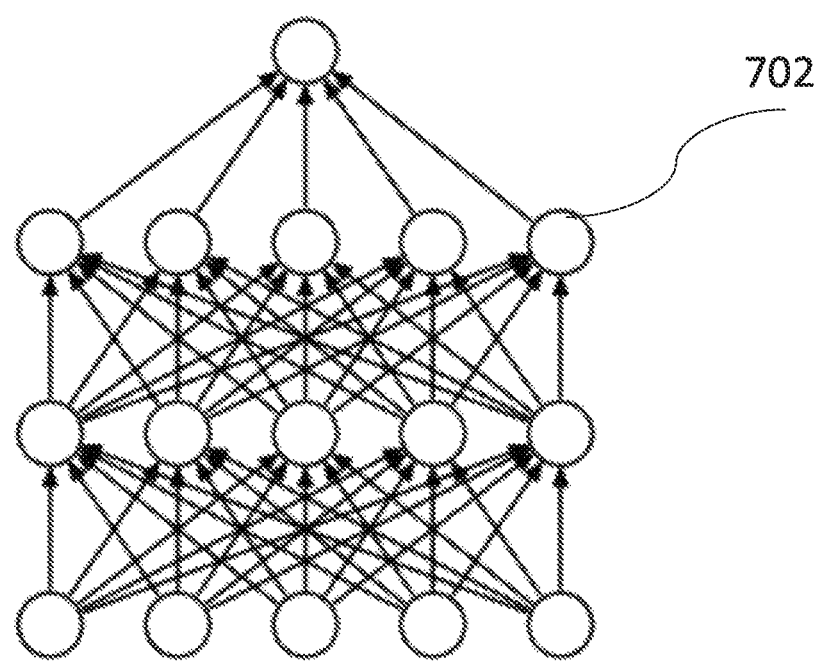
FIG. 7 is a diagram showing the structure of a neural network according to an embodiment of the present invention.

FIG. 7 shows an example of a neural network architecture, as may be used by embodiments of the invention. Individual neurons or nodes 702 may be connected to other neurons, and neurons may be organized into layers.

The following table summarizes example data used by embodiments of the invention.

| Block | Shape | Description |
| --- | --- | --- |
| A.1 Forecasted Data | (\|intervals\| X \|skills\| X \|features\|) | Time series depicting the workload the call center will need to handle. This multi-variate time series may include features such as volume (number of contacts across different channels), AHT, and average customer latency. |
| A.2 Required staffing metrics | (\|skills\| X \|service metrics\|) | The minimal service level a user could accept. User sets values for all variables. Possible metrics may include SLA (e.g., 80% of calls should be answered within 30 seconds) and chat latency (e.g., 80% of chat messages responded to within 60 seconds). |
| A.4 Staffing Requirements Plan | (\|intervals\| x \|skills\|) | For each interval, how many agents are needed in each skill. The staffing requirements plan will be used to create a schedule of actual agents. |
| B.1 Forecasted Interval Data | (\|skills\| X \|features\|) | A single time element from A.1. Forecasted data. This is the workload that needs to be handled during the interval. |
| B.3 Candidate Staffing Assignment | (\|skills\|) | A count vector of how many agents are suggested for each skill. Might become a single time element from A.4. |
| B.5 Predicted Service Metrics | (\|skills\| X \|service metrics\|). | Outputs of B.4. Predicted values for each service metric specified by user. |
| C.2 New Candidate | (\|skills\|) | A vector with positive entries in each cell representing the number of agents |

| Block | Shape | Description |
|---|---|---|
| | | suggested in the candidate staffing for the interval. |
| C.5 Candidate Adjustment | (\|skills\|) | A new candidate with increased personnel at skills that were understaffed and decreased personnel for skills that were overstaffed. |

Embodiments of the invention may take the output of an algorithm (e.g. staffing requirements for each skill for interval in the given period) and may use this output as an input for a scheduling system, which may assign specific agents for the shift. Embodiments of the invention may perform this action automatically, without human intervention.

Figure 8:
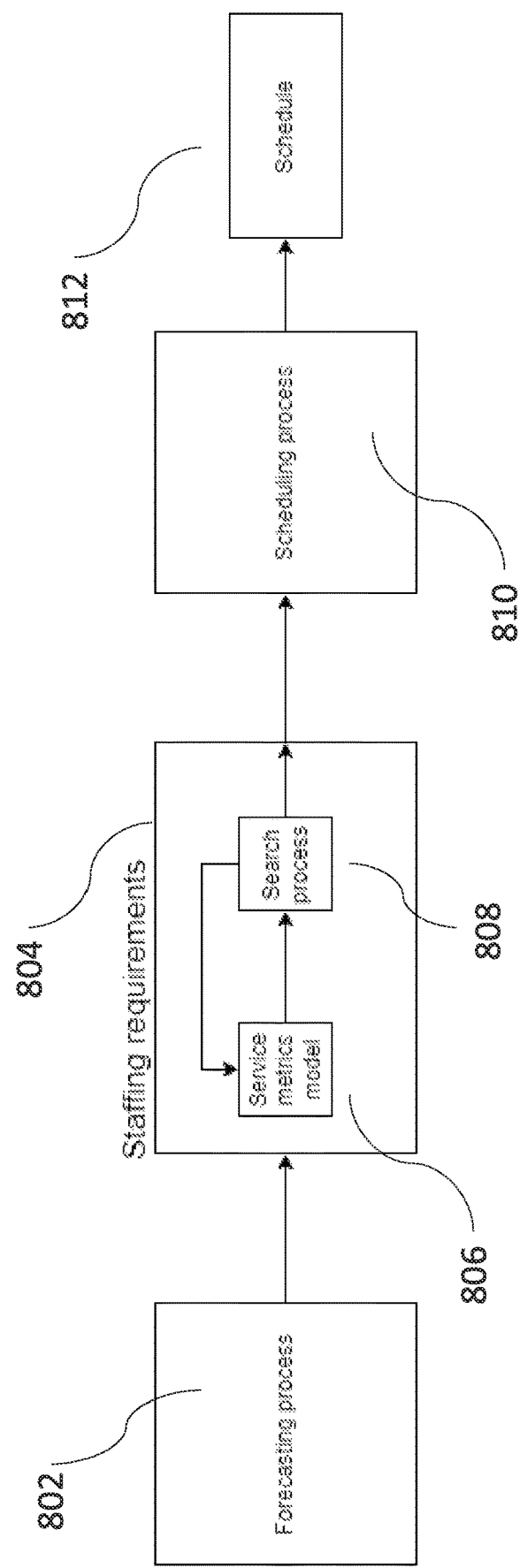
FIG. 8 is a block diagram of a system according to an embodiment of the present invention.

FIG. 8 demonstrates how a model according to embodiments of the invention is a working element of a wider process for creating staffing requirements. For example, a forecasting process 802, as may be known in the art, may generate forecasted data such as an expected workload for a given interval. Staffing requirements 804 may then be generated in accordance with embodiments of the present invention, for example by a trained service metrics model 806 (such as a machine learning model herein described) operating in iterative conjunction with a search process 808 (such as a search algorithm herein described). Generated staffing requirements may then be passed to a scheduling process 810, which may automatically produce a schedule 812.

Further, embodiments of the invention may be used to identify gaps in staffing as and when they are generated. Gaps in staffing may be due to unplanned events during the day, and embodiments of the invention may suggest proactive actions such as postponing a break, canceling training, etc.

Figure 9:
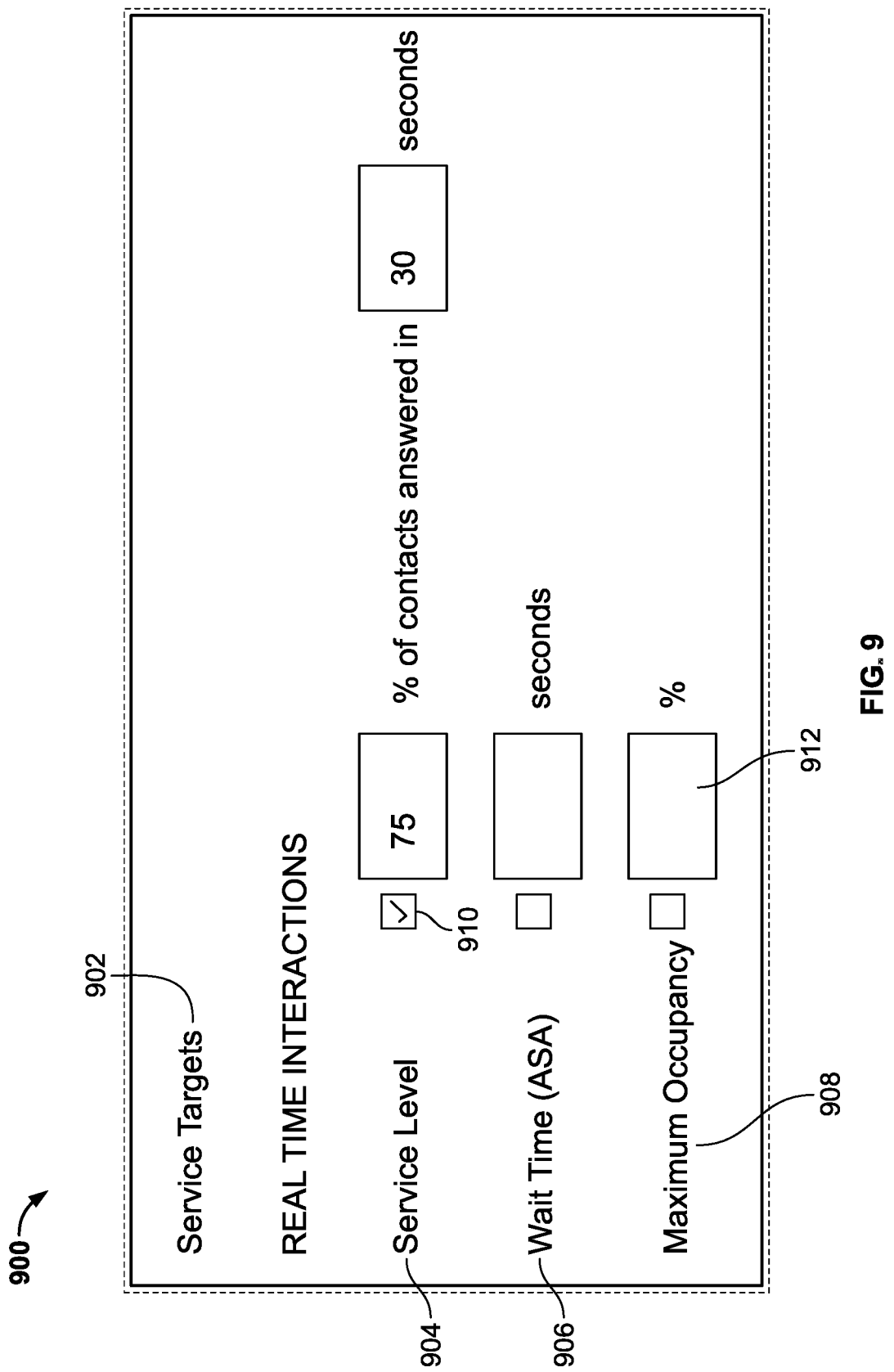
FIG. 9 is a representation of a graphical user interface according to an embodiment of the present invention.

FIG. 9 shows an example of a graphic user interface (GUI) 900 according to embodiments of the invention. Service Targets 902 may refer to a KPI designed to evaluate the experience of the contacting customers and the quality of service provided to them, in terms of work force and agent availability. Service level (SLA) 904, a common service metric, may allow the user to define the percentage of users answered within a selected time frame, e.g. 80% of customers answered within 20 minutes. Wait Time 906 (ASA) is a common service metric used for voice calls detailing how long customers waited until their call was picked up by an agent. Maximum Occupancy 908 may refer to a value meant to specify how far off the contact center should be from working at its full capacity. Using an interface 900 such as that shown by FIG. 9, a user may be able to set the desired target service metric values. User interface 900 may include checkboxes 910, which may allow a user to toggle or otherwise select which service metrics they wish to optimize. User interface 900 may include input fields 912, which may allow a user to enter a value (e.g. a numeric value) representing the desired service metric. User interface 900 may allow a user to change a duration of a time period, for example an interval, or a timeframe with respect to SLA. User interface 900 may include dropdowns or fields with which to change a time period, for example a dropdown list expressing units of seconds, minutes, hours, etc.

A system according to embodiments of the invention may take inputs from GUI 900 and conduct a search over the predictions of the neural network to find an optimal staffing candidate.

Embodiments of the invention may improve the technologies of computer automation, big data analysis, and computer use and automation analysis by using specific algorithms to analyze large pools of data, a task which is impossible, in a practical sense, for a person to carry out. Embodiments of the invention may improve existing scheduling technologies by rapidly and automatically analysing previously unutilized pools of historic data. Integration of embodiments of the invention into a contact centre environment may improve automated call-dialing technology. Embodiments of the invention may improve the technology of "smart" chats, which use contextual word recognition to automatically reply to client queries.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for allocating resources for a plurality of time intervals, the method comprising:
receiving, by an input layer of a machine learning model, a forecasted workload and at least one required service metric value for each of the plurality of time intervals, wherein the forecasted workload is included in a multivariate time series matrix, wherein the time series matrix has a number of cells corresponding to a product of: a number of the plurality of time intervals, and one or more features;
for each interval:
applying a search algorithm to identify an initial allocation assignment, wherein the initial allocation assignment comprises a count vector, and wherein the initial allocation assignment represents how many resources are suggested for each of a plurality of resource skills;

inputting the initial allocation assignment to a machine learning algorithm, wherein the machine learning algorithm has been previously trained on historic data of a plurality of past intervals, and wherein the machine learning algorithm comprises propagating the received workload through a sequence of dense layers in the machine learning model, wherein each of the dense layers is followed by a sigmoid activation;

predicting, for each at least one required service metric, by the machine learning algorithm, an expected service metric value provided by the initial allocation assignment based on at least one element from the multivariate time series matrix;

adjusting, by the search algorithm, the initial allocation assignment based on a difference between the expected service metric value and the corresponding at least one required service metric value, the adjusting using one or more scalar correction ratios for each of the resource skills;

iteratively repeating the applying, inputting, predicting, and adjusting operations until one of:
the expected service metric value predicted for an adjusted allocation assignment is within a predetermined distance of the corresponding at least one required service metric value for the interval; or
a predetermined time has elapsed; and automatically producing a schedule based on the adjusted allocation assignment.

2. The method of claim 1, comprising generating, from the iteratively adjusted allocation assignments, an allocation assignment plan for the plurality of time intervals.

3. The method of claim 1, wherein resources are classified by at least one skill.

4. The method of claim 3, wherein the forecasted workload comprises a workload broken down into one or more required resource skills for each of the plurality of time intervals.

5. The method of claim 1, wherein the forecasted workload comprises a volume of incoming communications.

6. The method of claim 5, wherein at least one incoming communication is chosen from a list comprising: short message service (SMS), web chat, and email.

7. The method of claim 1, wherein at least one required service metric is chosen from a list comprising: average speed of answer, service level agreement, abandoned percentage, chat latency, and maximum occupancy.

8. The method of claim 1, wherein the adjusting is based on a correction ratio determined by the equation:

$$\text{correction ratio} = \frac{(1 + \text{Expected Service Metric Value})}{(1 + \text{Required Service Metric Value})}.$$

9. The method of claim 1, wherein the machine learning algorithm comprises at least one of: a regression algorithm, a deep learning algorithm; a neural network; a fully connected neural network; or a convolutional neural network.

10. A system for allocating resources for a plurality of given time intervals, the system comprising:
a memory; and
a processor configured to:
receive, by an input layer of a machine learning model, a forecasted workload and at least one required service metric value for each of the plurality of time intervals, wherein the forecasted workload is included in a multivariate time series matrix, wherein the time series matrix has a number of cells corresponding to a product of: a number of the plurality of time intervals, and one or more features;
for each interval:
apply a search algorithm to identify an initial allocation assignment, wherein the initial allocation assignment comprises a count vector, and wherein the initial allocation assignment represents how many resources are suggested for each of a plurality of resource skills;
apply a machine learning algorithm to the initial allocation assignment to predict, for each at least one required service metric, an expected service metric value provided by the initial allocation assignment based on at least one element from the multivariate time series matrix, wherein the machine learning algorithm comprises propagating the received workload through a sequence of dense layers in the machine learning model, wherein each of the dense layers is followed by a sigmoid activation;
adjust the initial allocation assignment based on a difference between the expected service metric value and the corresponding at least one required service metric value, the adjusting using one or more scalar correction ratios for each of the resource skills;
iteratively repeat the applying, predicting, and adjusting operations until either:
the expected service metric value predicted for an adjusted allocation assignment is within a predetermined distance of the corresponding at least one required service metric value for the interval; or
a predetermined time has elapsed; and
automatically producing a schedule based on the adjusted allocation assignment.

11. The system of claim 10, wherein the processor is configured to generate, from the iteratively adjusted allocation assignments, an allocation assignment plan for the plurality of time intervals.

12. The system of claim 10, wherein the machine learning algorithm has been previously trained on historic data of a plurality of past intervals.

13. The system of claim 10, wherein the processor classifies resources by at least one skill.

14. The system of claim 13, wherein the received forecasted workload comprises a workload broken down into at least two required resource skills for each of the plurality of time intervals.

15. The system of claim 10, wherein the processor is configured to adjust the initial allocation assignment based on a correction ratio determined by the equation:

$$\text{correction ratio} = \frac{(1 + \text{Expected Service Metric Value})}{(1 + \text{Required Service Metric Value})}.$$

* * * * *